(12) United States Patent
Surkov et al.

(10) Patent No.: US 8,708,494 B1
(45) Date of Patent: Apr. 29, 2014

(54) DISPLAYING GLASSES WITH RECORDED IMAGES

(71) Applicant: Ditto Technologies, Inc., San Francisco, CA (US)

(72) Inventors: Sergey Surkov, Foster City, CA (US); Dmitry Kornilov, Saint Petersburg (RU)

(73) Assignee: Ditto Technologies, Inc., San Francisco, CA (US)

( * ) Notice: Subject to any disclaimer, the term of this patent is extended or adjusted under 35 U.S.C. 154(b) by 0 days.

(21) Appl. No.: 13/830,483

(22) Filed: Mar. 14, 2013

Related U.S. Application Data

(63) Continuation-in-part of application No. 13/361,835, filed on Jan. 30, 2012.

(51) Int. Cl.
| | |
|---|---|
| *G02C 3/00* | (2006.01) |
| *G02C 7/00* | (2006.01) |
| *G02C 7/02* | (2006.01) |
| *A61B 3/04* | (2006.01) |
| *A61B 3/10* | (2006.01) |
| *G02C 13/00* | (2006.01) |

(52) U.S. Cl.
CPC .............. *G02C 13/005* (2013.01); *G02C 7/028* (2013.01); *A61B 3/04* (2013.01); *G02C 13/003* (2013.01); *G02C 7/02* (2013.01); *G02C 7/027* (2013.01)
USPC ........................ 351/227; 351/159.75; 351/204

(58) Field of Classification Search
USPC ......... 351/159.73–159.77, 41, 177, 200, 227, 351/246; 702/150–153; 703/1, 2; 705/26.64, 27.1, 27.2
See application file for complete search history.

(56) References Cited

U.S. PATENT DOCUMENTS

| | | | | |
|---|---|---|---|---|
| 4,852,184 | A | * 7/1989 | Tamura et al. | 382/282 |
| 6,944,327 | B1 | * 9/2005 | Soatto | 382/154 |
| 7,016,824 | B2 | 3/2006 | Waupotitsch et al. | |
| 7,292,713 | B2 | * 11/2007 | Fukuma et al. | 382/118 |
| 2010/0179789 | A1 | * 7/2010 | Sachdeva et al. | 703/1 |

* cited by examiner

*Primary Examiner* — Mahidere Sahle
(74) *Attorney, Agent, or Firm* — Van Pelt, Yi & James LLP

(57) ABSTRACT

Processing a set of images is disclosed, including: receiving a set of images; and searching for a representation of a user's face associated with the set of images and a plurality of sets of extrinsic information corresponding to respective ones of at least a subset of the set of images. Rendering a glasses frame is disclosed, including: receiving a selection associated with the glasses frame; rendering the glasses frame using at least a representation of a user's face and a set of extrinsic information corresponding to an image in a recorded set of images; and overlaying the rendered glasses frame on the image.

28 Claims, 20 Drawing Sheets

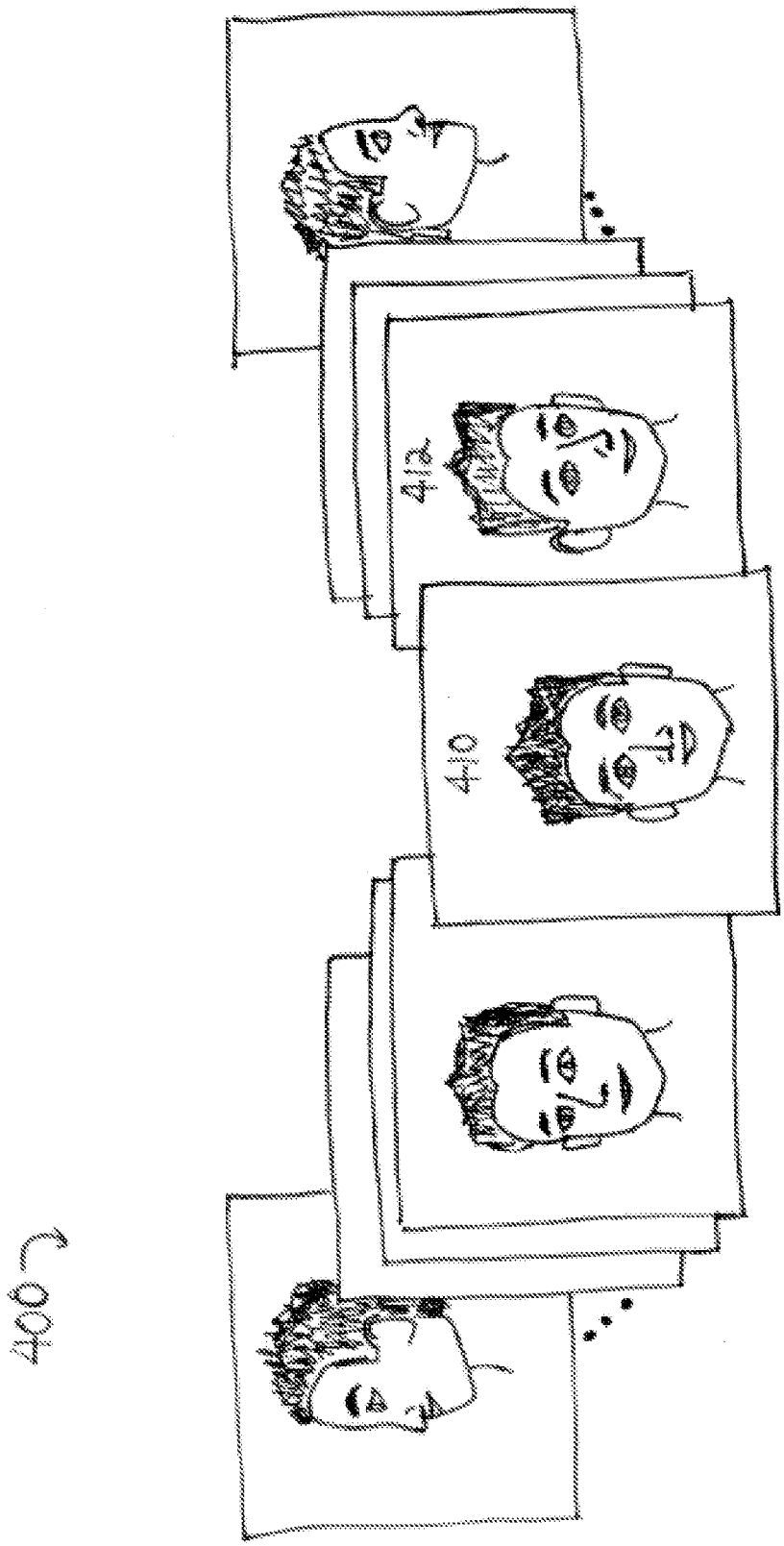

| | Name | Price | Fit Score |
|---|---|---|---|
| 910 | 912 | 914 | 916 |
|  | Frame 1 | $99 | 9.6 |
|  | Frame 2 | $120 | 9.5 |
|  | Frame 3 | $200 | 8.0 |

$(R, t)_N$ $(R, t)_N$

DISPLAYING GLASSES WITH RECORDED IMAGES

CROSS REFERENCE TO OTHER APPLICATIONS

This application is a continuation in part of co-pending U.S. patent application Ser. No. 13/361,835 entitled FITTING GLASSES FRAMES TO A USER filed Jan. 30, 2012, which is incorporated herein by reference for all purposes.

BACKGROUND OF THE INVENTION

A person seeking to buy glasses usually has to go in person to an optometrist or an eyewear store and try on several glasses frames to see if they fit them. Typically this requires a few hours of browsing through several rows of glasses frames and trying on many pairs of glasses frames, most of the time without prior knowledge of whether a particular glasses frame fits or not. Although glasses frames are designed to fit most people, not all heads are the same size and therefore not all glasses will fit a person. Additionally, glasses frames not only have the functional purpose of correcting the wearer's vision, but also an aesthetic purpose, which adds other factors to the selection process. What is needed is a way to fit glasses frames to people more efficiently.

Various embodiments of the invention are disclosed in the following detailed description and the accompanying drawings.

FIG. 4A is an example of received images and/or video frames of the user's head.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
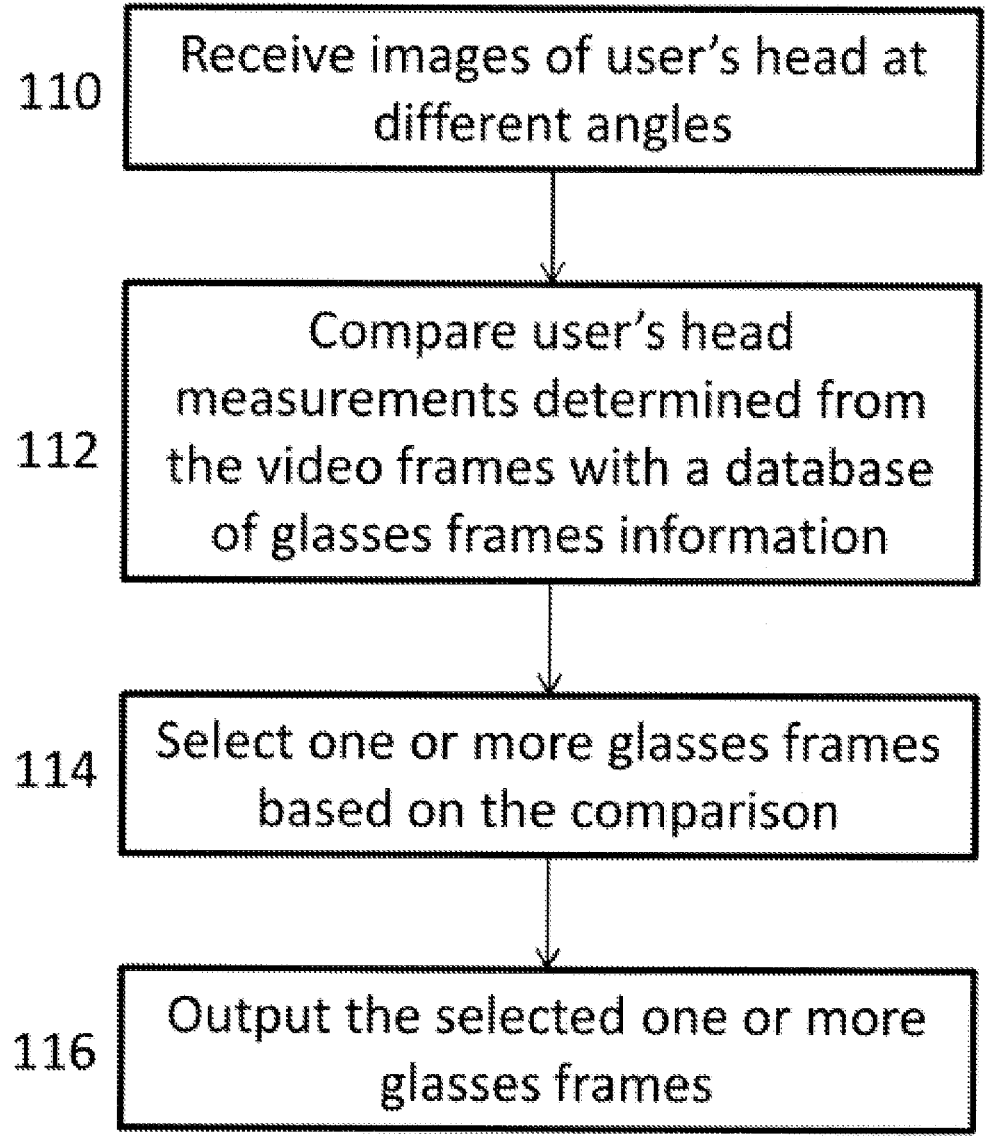
FIG. 1A is a flow chart illustrating a method for selecting glasses frames that fit a user's head.

FIG. 1A is a flow chart illustrating a method for selecting glasses frames that fit a user's head. At step 110, images are received of the user's head at different angles. In some embodiments, at 110, a video or a plurality of video frames of the user's head is received. At step 112, the user's head measurements determined from the images are compared to a database of glasses frame information. In some embodiments, at step 112, the user's head measurements are determined from a video or a plurality of video frames. At step 114, one or more glasses frames are selected from the database of glasses frame information based at least in part on the comparison. At step 116, the one or more selected glasses frames are outputted.

Figure 1B:
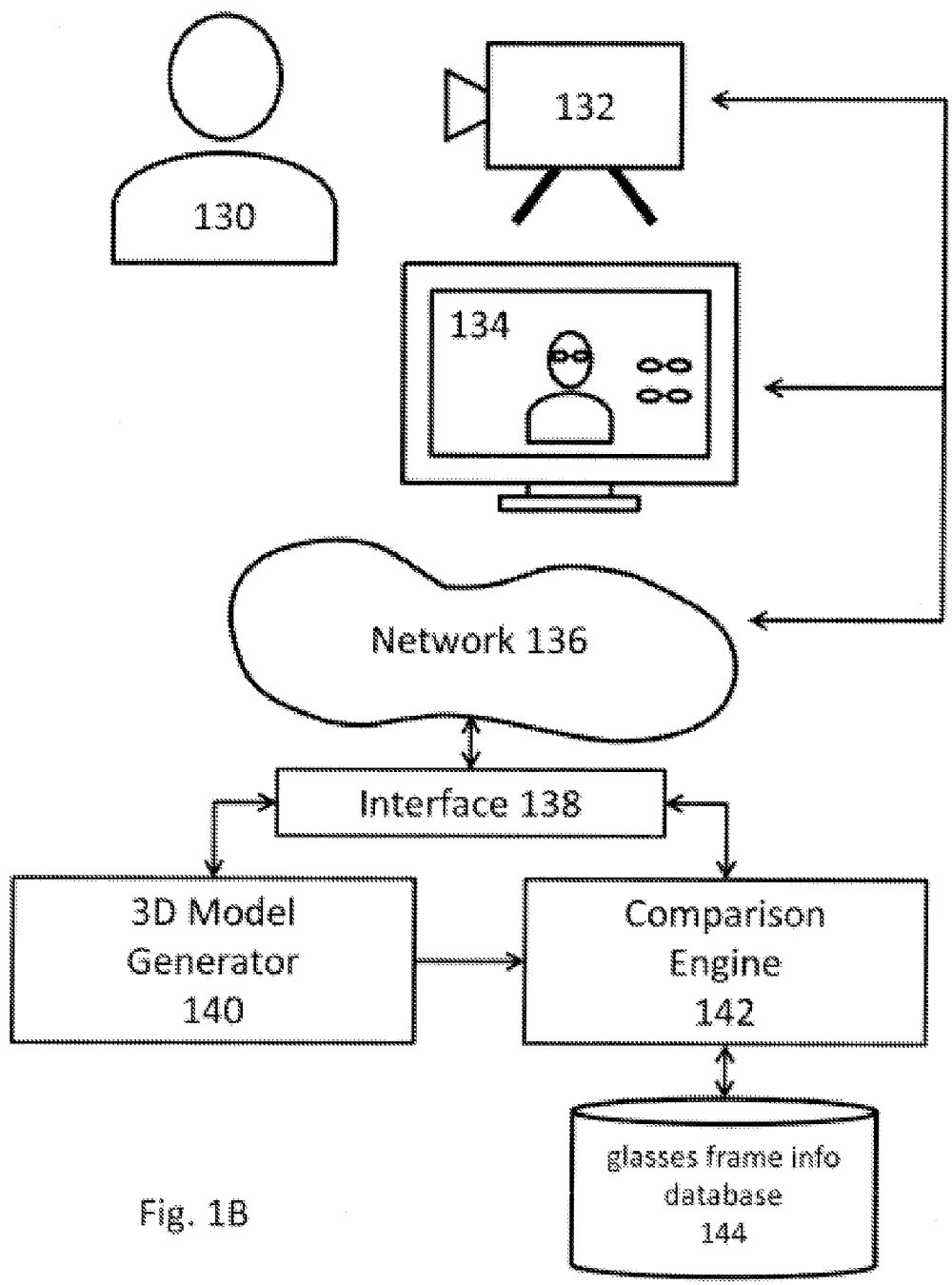
FIG. 1B is a diagram illustrating an example of a system for selecting glasses frames that fit a user's head.

FIG. 1B is a diagram illustrating an example of a system for selecting glasses frames that fit a user's head. User 130 is in front of a camera 132 or webcam in communication with a processor that is running an application that captures video frames and/or images of the user's head. In some embodiments, the captured video frames and/or images are transferred through a network 136 (e.g., WIFI, 3G or local area network). An interface 138 receives the video frames and/or images. In some embodiments, the application capturing the video frames/images or fitting glasses to the user, or portions of the application, is executed on one or more processors and can be located at the client or on the server or a combination of the client and server.

The 3D model generator 140 determines the user's head measurements and a three-dimensional (3D) model from the video/images received of the user's head at different angles. The 3D model may include one or more of the following: images/video frames of the user's head, reference points on the user's head, user head measurements, and a set of rotation/translation matrices. In some embodiments, the 3D model contains only reference points associated with the user's head. In some embodiments, an initial 3D model is first obtained from a subset of the received video frames/images. Then the initial 3D model can be adjusted into an adjusted 3D model using an iterative algorithm incorporating additional information from the received video frames/images.

In some embodiments, the images are captured at the client computer and sent over the internet to a server to process the images and create a 3D model of the user's head. In some embodiments, the client computer can create the 3D model of the user's head and send the 3D model over the internet to select glasses that fit the user. Other embodiments with different tasks being executed by different processors or different locations are also included in the scope of this invention. In some embodiments, a scaling reference is captured with the user's head when obtaining video and/or images at step 110 of FIG. 1A. For example, the user is instructed to hold a scaling reference to the user's head and an image is captured of the user with the scaling reference in order to properly scale the user's head measurements and fit glasses frames to the user. In some embodiments, the scaling reference is a measurement in standard units of something in the video frame/image (for example a pupillary distance), is entered by the user. In some embodiments, the camera is calibrated using the video/images captured of the user with or without the scaling reference.

Comparison engine 142 compares the user head measurements from the 3D model to a database of glasses frame information 144. A penalty function for each of the measurements that factors in fit is used to compare the glasses frame and the user's head measurements. A detailed description of the penalty function is disclosed later in the specification. One or more glasses frames are selected based on a score computed from the penalty function and set thresholds of the score that comprise different levels of fit.

In some embodiments, the outputting of glasses frame information at step 114 of FIG. 1A comprises displaying information associated with one or more glasses frames determined to match a user. In some embodiments, after the user's head measurements are determined, the selected glasses that fit the user are displayed to the user on display 134. In some embodiments, the glasses frame information includes a fit score. In some embodiments the one or more glasses frames determined to match a user are displayed in a list or ordered list associated with the fit score and/or one or more other attributes associated the user and/or the glasses frames in the list. In some embodiments, the at least one of the selected glasses is rendered on an image associated with the user. In some embodiments, at least one of the selected glasses is rendered on a 3D interactive model of the user. This allows the user to visualize how the user looks with a selected pair of glasses. In some embodiments, this allows the user to more easily decide to purchase a pair of glasses without having to visit a physical store.

Figure 2A:
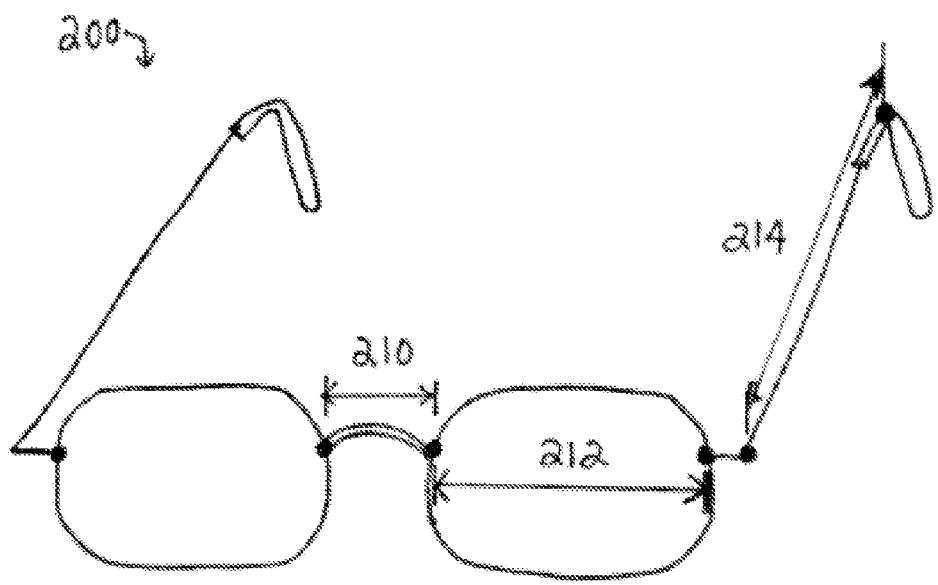
FIG. 2A is a diagram illustrating an example of relevant measurements of a glasses frame.

FIG. 2A is a diagram illustrating an example of relevant measurements of a glasses frame. Glasses frame 200 is measured to obtain relevant distances of a glasses frame. In some embodiments, the relevant distances are bridge length 210, lens diameter 212, and temple distance 214. In some embodiments, the overall frame width (which is not shown in the example) is also measured. The bridge length 210 is the distance between the two lenses of the glasses frame. The lens diameter 212 is the diameter of one of the lenses. The temple distance 214 is the length of the glasses frame arm from the corner of the lens to the bend on the temple tips, which goes over the user's ear. In other embodiments, other distances can be measured from the glasses frames. In various embodiments, other ways of expressing the distances, for example, positions of endpoints of each of the distances in a 3D coordinate system, length and offset from a common origin, or an array of points representing each line of the glasses can be stored.

Figure 2B:
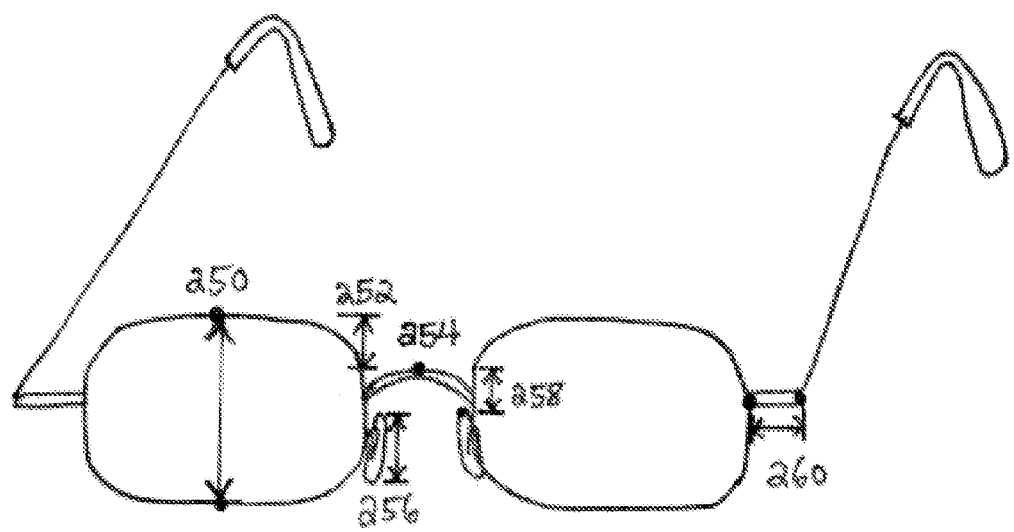
FIG. 2B is a diagram illustrating an example of other relevant measurements of a glasses frame.

FIG. 2B is a diagram illustrating an example of other relevant measurements of a glasses frame. Other relevant measurements of the glasses frame comprise lens height 250, vertical lens offset 252, bridge apex position 254, bridge height, nosepad length and position 256, nosepad vertical offset 258, end piece offset and end piece length 260.

The measurements of the glasses frames comprise a portion of the glasses frame information stored in a database. In some embodiments, glasses frames are measured and the measurements are stored in a database. In some embodiments, a 3D model of each glasses frame is stored in the database. In some embodiments, the glasses frames are scanned with a 3D imager and are stored in the database. In some embodiments, other glasses frame information is stored in the database, including one or more of the following: glasses frame measurements, identifier, name, picture, manufacturer, model number, description, category, type, glasses frame material, brand, part number, and price.

Figure 3:
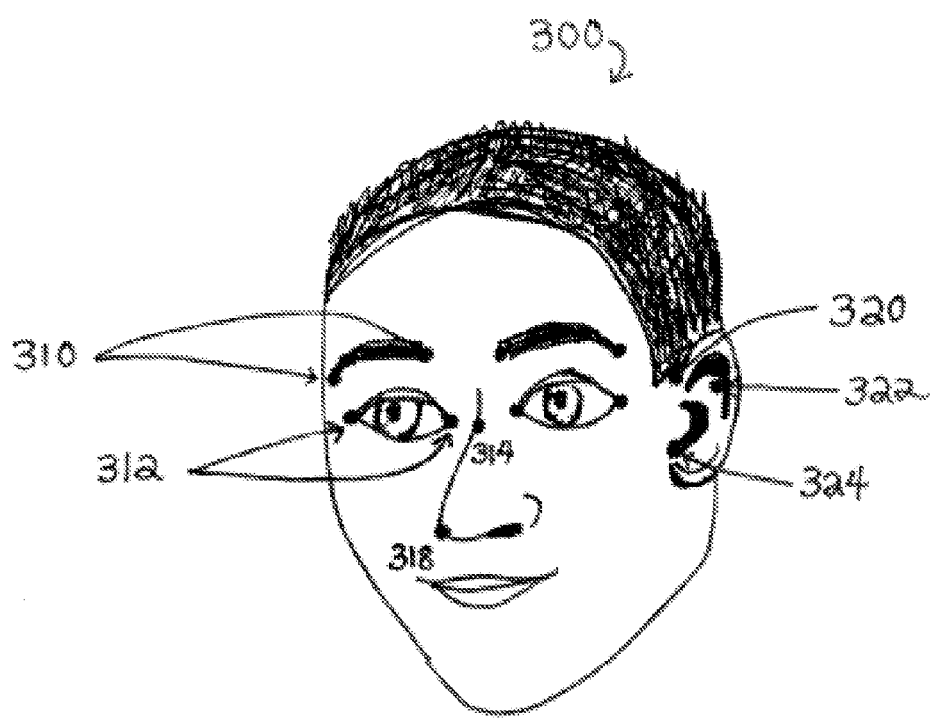
FIG. 3 is a diagram of an example set of reference points on a user's head.

FIG. 3 is a diagram of an example set of reference points on a user's head 300. The reference points are used to determine user head measurements. For example, the endpoints of the user's eyebrow 310, endpoints of the user's eye 312, bridge of the user's nose 314, tip of the user's nose 318, the top point where the helix (the rounded top edge of the ear) joins the head 320, the middle of the antihelix 322 (the flatter lump inside of the helix of the ear), and the bottom of the user's intertragus notch 324 are the reference points obtained from the video frames and/or images. In some embodiments, the reference points are used in calculating the user's head measurements and are a portion of the 3D model of the user's head. Other reference points and other measurements can be obtained from the video frames and/or images of the user's head. For example, other relevant reference points include the midpoint between the user's eyes, the left and right cheekbones, the highest point of the ear lobe or other reference points on a user's head. In some embodiments, a subset of the reference points listed is used. In some embodiments, other reference points of the user's head are used.

FIG. 4A is an example of received images and/or video frames of the user's head. In some embodiments, the user is in front of a webcam and video is captured of the user's head. The user is instructed to turn their head as the camera captures video frames of the user's head. In some embodiments, the user is instructed to look left and then look right. In some embodiments, the user is shown a video clip or an animation of a person turning their head and instructed to do the same. Video frames 400 that were captured and received include at least the user's head at different angles or facing different directions. For example, video frame 410 is an image of the user's head turned at an angle that faces the video camera. Video frame 412 shows the user's head turned at another angle slight to the user's left. The number of video frames captured can vary. The camera can be instructed by a processor to capture the user's head with a continuous video or snapshots (for example, series of images with a delay between captures). In some embodiments, the camera captures images of the user's head in a continuous capture mode, where the frame rate can be lower than capturing a video. The video frames and/or images 400 are then sent to a processor for obtaining user head measurements and fitting to glasses frames. The processor can be local or remote, for example on a server.

Figure 4B:
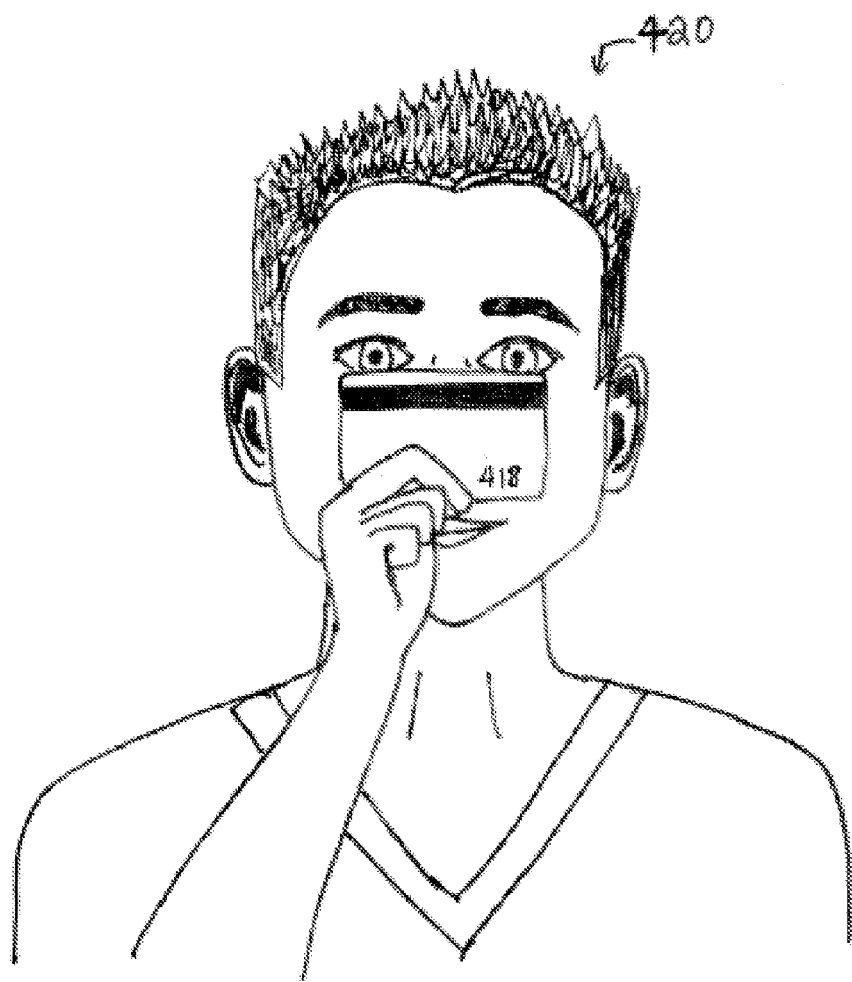
FIG. 4B is an example of a scaling reference needed in order to properly scale the images and/or video frames of the user's head to properly fit the glasses.

FIG. 4B is an example of a scaling reference used at least in part to scale the images and/or video frames of the user's head to properly fit the glasses. For example, a credit card-sized object 418 is held up to the user's head 420 for scaling. During the process of fitting glasses frames to a user, the user is instructed to hold the credit card-sized object to the user's face. A camera or webcam directed at the user can then capture a short video or an image of the user with a credit card next to their face. In some embodiments, the credit card-sized object is held on or near various places, for example the bridge of the user's nose. In some embodiments, the scaling reference is a pattern of a predefined physical size displayed by an object such as, for example, a smartphone (e.g., Apple iPhone®). In some embodiments, the scaling reference is a measurement in standard units of something in the video frame/image (e.g., a pupillary distance) and is provided by the user. In some embodiments, a different scaling reference object with a standard and known measurement is used. For example, a coin (e.g., a quarter) is held next to the user's eye.

Additionally, the short video or the image of the user with a scaling reference object is used at least in part to calibrate the camera. By detecting points on the scaling reference object with a known measurement and image characteristics, a matrix representing camera intrinsic parameters is determined and used to calibrate the camera. The camera intrinsic parameters are found by correlating points on the scaling reference object between different video frames/images of the user with the scaling reference object, and calculating the matrix that represents the camera intrinsic parameters using a camera calibration algorithm. In some embodiments, instead of using calibration to a scaling reference object, auto-calibration or self-calibration (e.g., to recorded images), which does not require a scaling reference, is used.

Figure 5:
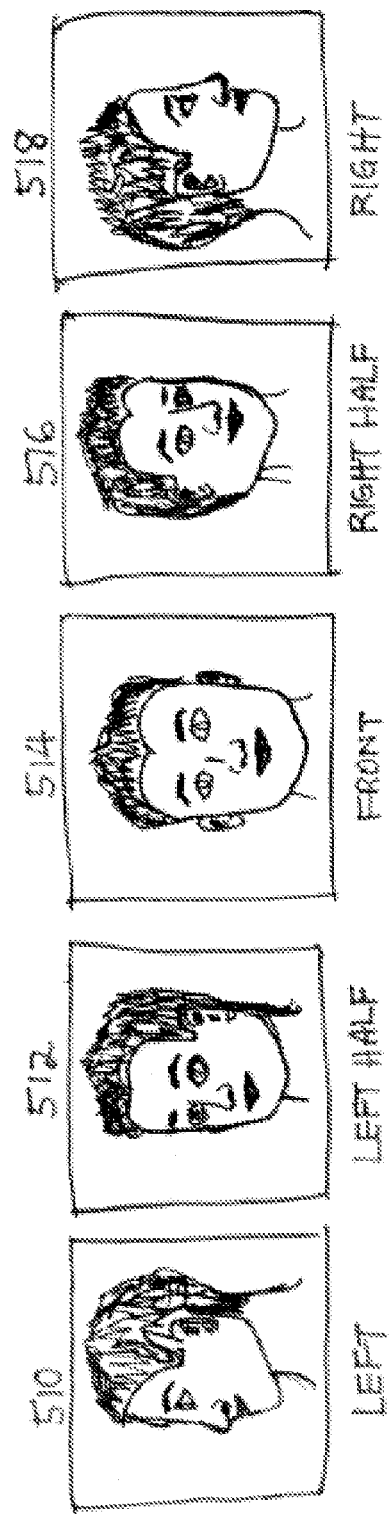
FIG. 5 is a diagram illustrating an example set of orientations used in the process of making an initial 3D model of the user's head and determining user head measurements.

FIG. 5 is a diagram illustrating an example set of orientations used in the process of making an initial 3D model of the user's head and determining user head measurements. The initial 3D model is used in the process of making an adjusted 3D model, from which the user's head measurements are determined. Images/video frames of the user's head are received and then categorized into a set of orientations. For example, a set of orientations used comprises left profile 510, left half 512, front 514, right half 516, and right profile 518. In some embodiments, the set of orientations used comprises left facing, front facing, and right facing. In some embodiments, the set of orientations used comprises one or more of the following: 0 degrees, 45 degrees, 60 degrees, 90 degrees, 120 degrees, 135 degrees, and 180 degrees. By comparing reference points obtained from the images/video frames of the user's head to a model of each of the different orientations, each received image/video frame is categorized into an orientation. In some embodiments, heuristics are used in combination with models of each orientation to categorize the received image/video frames. For example, if the user's right eye is not shown in the image/video frame of the user's head, the image/video frame is categorized as left profile. Or if the user's left eye and only a portion of the user's right eye is in the image/video frame, then the image/video frame is categorized as a left half. Also, for example, if both eyes are seen about equally in the image/video frame, then the image/video frame is categorized as front facing. In some embodiments, a statistical approach is used to categorize the received image/video frames into a set of orientations. Using the statistical approach, the probability of mutual feature positions under different orientations for each image/video frame is calculated and each image/video frame is then categorized into the orientation with the highest probability.

Figure 6A:
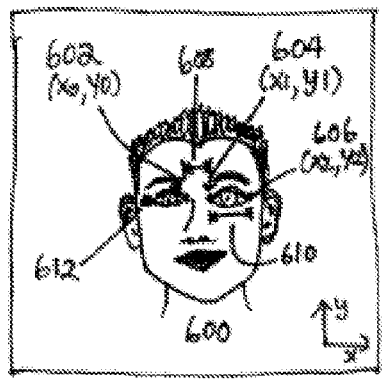
FIG. 6A and FIG. 6B illustrate an example of reference points obtained from a set of images/video frames of the user's head.
Figure 6B:
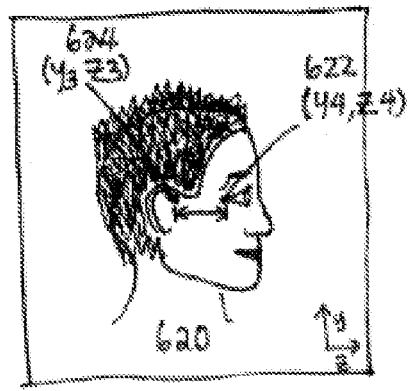

FIG. 6A and FIG. 6B illustrate an example of reference points obtained from a set of image/video frames of the user's head. The reference points are then used to generate an initial 3D model. FIG. 6A shows image/video frame 600, where the user is in the front orientation and reference point 602 is at the inside corner of the user's right eye, which is assigned coordinates (x0, y0). Reference points of the eye may also include inside left eye reference point 604 with coordinates (x1,y1) and outside left eye reference point 606 with coordinates (x2,y2). From the two reference points inside right eye 602 and inside left eye 604, a bridge distance 608 can be determined. In some embodiments, a lens distance can be determined using inside left eye reference point 604 and outside left eye reference point 606. FIG. 6B shows another orientation, right profile 620, with outside right eye reference point 622 with coordinates (y4, z4) and top point where the helix joins the head reference point 624 with coordinates (y3, z3). From the profile pictures, the z coordinate can be added to the initial 3D model. From the two-dimensional video frames of the user's head, an initial 3D model of the user's head can be determined.

Reference points are obtained from images/video frames of the different orientations. In some embodiments, a best image/video frame for each of the orientations is selected to be used in determining reference points and user head measurements that can be at least in part used to generate the initial 3D model, as shown in FIGS. 6A and 6B. For example, the best image/video frame out of the front orientation is the image/video frame in the front facing orientation with the maximum distance between the endpoints of the eyes. For example, the image/video frame with the largest distance between the right eye and the right ear is determined as the best right profile. Other embodiments for the selection of the best image/video frames include machine learning or various heuristics for certain models that best fit a certain orientation.

Figure 6C:
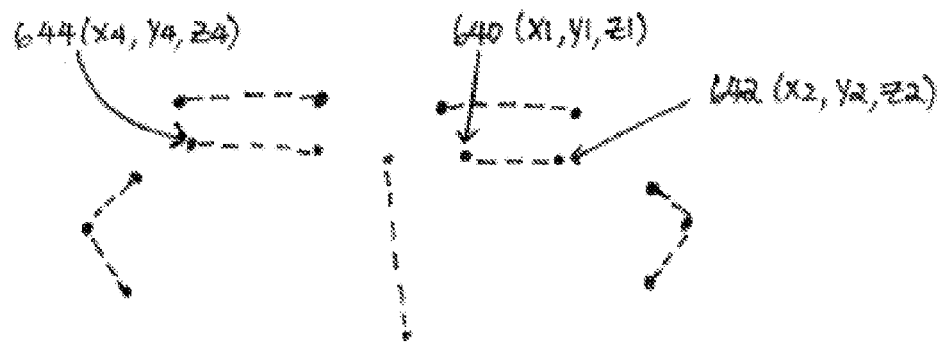
FIG. 6C is a diagram illustrating the initial 3D model comprising a set of reference points.

FIG. 6C is a diagram illustrating an embodiment of the initial 3D model comprising a set of reference points. In some embodiments, reference points from the 2D images/video frames are combined to make the 3D model of FIG. 6C. The corresponding reference points are combined to make a set of (x,y,z) coordinates representing the position of each of the reference points on the user's head. For example, the (x,y) coordinates of the outside corner of the right eye 612 from the front orientation video frame 600 could be combined with the z coordinate of the outside right eye reference point 622 in the right orientation image/video frame 620 to obtain the reference point 644 with coordinates (x4, y4, z4). The set of (x,y,z) coordinates comprise a portion of the initial 3D model. As shown in the dashed lines of FIG. 6C, the points in the initial 3D model, can be used to generate a representational image of a user's face.

In some embodiments, the initial 3D model comprises an average of reference points in 3D space from a set of users. Using a set of users instead of just the user's face, a generic face is used as the initial 3D model. Instead of generating the initial 3D model from the reference points of the user's head, the generic 3D model is used as a starting point and then adjusted. In some embodiments, the generic 3D model does not include the user's reference points, but is from previous users of the system and/or a predetermined generic model. In some embodiments, the reference points from the user's head are averaged with other users to at least in part generate an initial 3D model.

Figure 7:
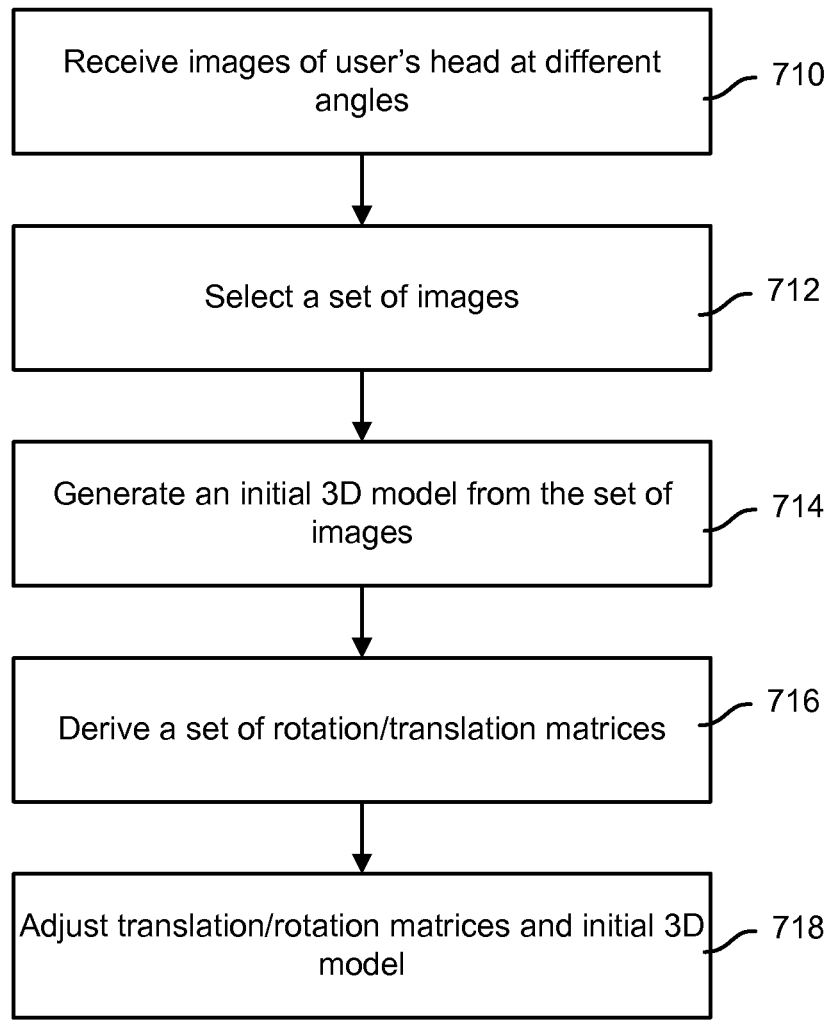
FIG. 7 is a flowchart illustrating an embodiment of a process for adjusting the initial 3D model into an adjusted 3D model to be used in the comparison and the fitting.

FIG. 7 is a flowchart illustrating an embodiment of a process for adjusting the initial 3D model into an adjusted 3D model to be used in the comparison and the fitting. In step 710, the images/video frames of a user's head at different angles are received. At step 712, a set of images/video frames is selected. In some embodiments, the selected set of images/video frames is the best image/video frame from each of the different orientations. At step 714, the initial 3D model is generated from the set of video frames. The initial 3D model comprises a set of (x,y,z) coordinates in 3D space. At step 716, a set of rotation/translation matrices is derived that transform the initial 3D model into the 2D coordinates in each of the images/video frames. Therefore, there will be a rotation/translation matrix for each image/video frame. Then at step 718, the rotation/translation matrices are adjusted. An adjusting algorithm is used to iteratively adjust each rotation/translation matrix and the coordinates of the 3D model. The camera intrinsic parameter matrix is also included during the adjusting. The adjusting algorithm continues until the rotation/translation matrices and the coordinates of the 3D model converge to those that best describe the reference points observed in the received images/video frames that represent user head's measurements. This converged set of coordinates comprises an adjusted 3D model that is used for fitting and comparison. Therefore, even if the initial model is the generic face, the 3D model is adjusted to match the reference points from the video frames of the user, which correspond to the specific real-life user's head that glasses frames are to be fitted to. In some embodiments, a bundle adjust algorithm that minimizes reprojection error is used to refine the initial model. In some embodiments, the adjusting algorithm comprises an algorithm that maximizes the likelihood of the received images/video frames parameterized by the 3D model and rotation/translation matrices. In some embodiments, the user head measurements are calculated from the adjusted 3D model and stored with the 3D model. In some embodiments, the 3D model also comprises the received set of images/video frames of the user's head at different angles and the rotation/translation matrices. Other information like a user ID or user account information and the resulting selected glasses frames for the user are also included in the 3D model in some embodiments.

Figure 8:
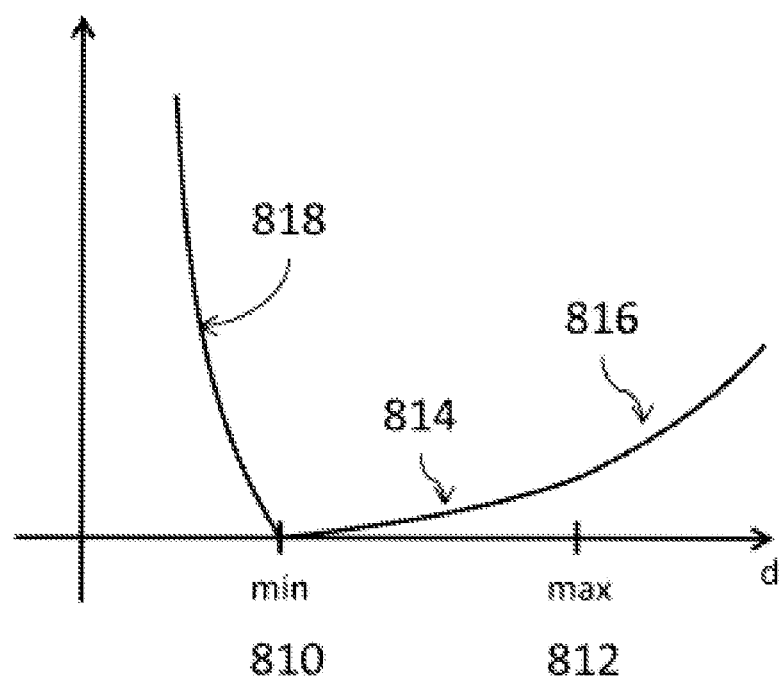
FIG. 8 is an illustration of an example of a penalty function used to evaluate fit of glasses frames.

FIG. 8 is an illustration of an example of a penalty function used to evaluate fit of glasses frames. For example, the penalty function in FIG. 8 could be used to evaluate the bridge length. The x-axis is the distance of the feature being evaluated. The minimum bridge length 810 is the exact distance of the user's bridge and is the ideal bridge length of the glasses frame. The penalty function 818 increases rapidly as the bridge length of the glasses frame gets smaller than the user's bridge distance. For glasses frame's bridge lengths that are larger than the minimum distance and smaller than the maximum bridge distance, the penalty 814 increases at a slower rate. Past the maximum bridge distance, the penalty 816 then increases at a higher rate. In the same way, the other distances, temple distance and lens diameter, are evaluated for a penalty. For the temple distance and lens diameter, the same function or different functions can be used. The penalty function for each of the distances that factor into evaluating fit can also have different shapes, for example, a shifted and flipped step function, a piecewise function, other parabolic functions, or any other appropriate function.

In some embodiments, the penalty functions have a priority. For example, the bridge length penalty may have a higher weight than the temple distance penalty or the lens distance penalty. In some embodiments, the bridge distance penalty is greater than the temple distance penalty, which is greater than the lens distance penalty.

$$P_{d_{bridge}} > P_{d_{temple}} > P_{d_{lens}}$$

In another example, the frame width penalty may be greater than the bridge distance penalty, which may be greater than the temple distance penalty, which may be greater than the lens distance penalty. In some embodiments, the scale of the y-axis of the penalty function determines the weight of the penalty. In some embodiments, the penalty functions can be normalized and then multiplied with a constant representing their relative weights. Other combinations of penalty function shapes and scaling can also be used to relatively weight the penalty functions.

For each glasses frame compared to the user's head measurements, a score is then calculated using the penalty functions, using a linear combination of weighted penalties. For example, when evaluating one glasses frame with a 15 mm bridge length, if the user's bridge distance is 27 mm, then from the penalty function, the penalty is high, for example 8.5, because the bridge length is much less than the user's bridge distance. The bridge length penalty is then multiplied with its relative weight, which is 1, for the bridge length. In this example, the temple distance has a relative weight constant that is 0.75 and the lens diameter has a relative weight of 0.5. Likewise the temple distance and lens diameter of the glasses frame is evaluated to the user head measurements using a penalty function. Then each of the weighted penalties are added together to create a score. In some embodiments, other distances are factored into the score, e.g., lens height compared to eyebrows and cheekbone positions. In some embodiments, other factors like feedback mechanisms and user reviews are also factored into the score of the glasses frame to the user. In some embodiments, other preferences of the user that are designated by the user, e.g., glasses frame material preferred or glasses frame weight, are factored into the score and make a qualitative fit score for the user.

The scores for the glasses frames are then sorted or ranked in ascending or descending order. For example, the penalties are sorted in ascending order and the glasses frame with the least penalty corresponds to the best fitting. In some embodiments, a threshold is set of a score that indicates that the glasses frame does not fit the user. In some embodiments, other thresholds are also set, for example, a threshold for glasses frames that ideally fit the user, or a threshold for glasses that have a good fit. The thresholds can be set as a numerical constant or as a relative threshold, for example, taking the top 25% of results of glasses that represent a good fit. The scores can also be scaled to be more user-intuitive, like a scale of 1 to 10, to indicate a fit score. Using the scores and thresholds, a set of glasses frames are selected into a results list. In some embodiments, the results list comprises all glasses in the database that fit the user (i.e., all glasses above the "does not fit" threshold). In some embodiments, only the glasses frames that ideally fit the user are selected for the results list. In some embodiments, all of the glasses frames are selected and are associated with a fit score for the user.

Figure 9:
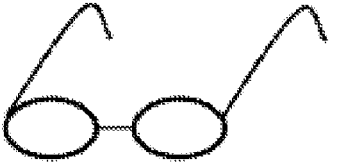
FIG. 9 is an illustration of an example of a results list of glasses frames outputted to be displayed.
Figure 9:
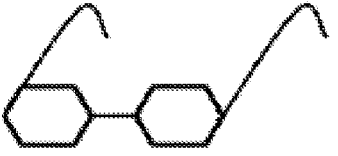
Figure 9:

FIG. 9 is an illustration of an example of a results list of glasses frames outputted to be displayed. In some embodiments, the results list is displayed in a web browser. The list of results shows a picture of the glasses frame 910, name of the glasses frame 912, price of the glasses frame 914, and the fit score 916. The list is ordered in descending order based on fit score. The fit score is on a scale of 1 to 10 for better user intuitiveness. Other glasses frame information can also be outputted to be displayed, for example, glasses frame measurements, identifier, name, picture, manufacturer, model number, color, description, category, type, glasses frame material, brand, part number, and price. In some embodiments, the list of results is further narrowed and filtered according to user preferences. In some embodiments, the glasses fitting method and system can be embodied as an API (Application Programming Interface) and the selected glasses are outputted to other web applications, for example, used in a search of an online glasses frame seller to display only glasses frames that fit the user. In some embodiments, the selected glasses are sent to a display to be rendered on a 3D model of the user's head. The 3D model of the user's head is also interactive and the user can interact with the model and see how the glasses may look on the user. In some embodiments, the adjusted 3D model of the user's head and results list of selected glasses and associated scores of each of the glasses frames compared to the user are stored in a database for further use. For example, a user seeking glasses saves the results list and shares the results list and model with friends through a link or an account, to get another friend's opinion. In some embodiments, the results list and 3D models are used to allow other people to buy glasses for another person on the internet, or fit another person to glasses who cannot visit a physical store.

Embodiments of displaying glasses with recorded images are described. In various embodiments, a recorded set of images of various orientations of a user's face is received. In various embodiments, a user's face includes the user's head as well. For example, the set of images may be recorded by a user turning his or her head in various directions at a camera. An optimal representation of the user's face associated with the set of images in three-dimensional (3D) space is searched for among a distribution of possible representations. Also, an optimal set of extrinsic information (e.g., matrices of rotation and translation in 3D space) associated with each image of the set of images among is searched for a distribution of possible sets extrinsic information for that image such that the selected set of extrinsic information can be used to transform/orient/translate the representation of the user's face to best match the orientation of the user's face in that particular image. In some embodiments, at least a portion of the determined representation of the user's face for the set of images and the sets of extrinsic information corresponding to respective ones of the set of images are used to model the user's face in determining renderings of a glasses frame to be overlaid on the recorded set of images in a playback of the set of images to the user.

In various embodiments, a selected glasses frame is received. The selected glasses is rendered using a representation of a user's face and a set of extrinsic information associated with the image in a recorded set of images for which the glasses is to be rendered. The combination of information associated with the selected glasses frame and the representation of a user's face is transformed/oriented/translated using the set of extrinsic information to yield the rendering of a user's face at an orientation associated with the image corresponding to the set of extrinsic information. In some embodiments, occlusion culling of the portions of the glasses frame that are hidden in the orientation associated with the image associated with the set of extrinsic information is also performed during the rendering. The rendered glasses frame is overlaid on the image corresponding to the set of extrinsic information to result in the appearance of the glasses frame at the same orientation as the user's face in that image and at an appropriate location in the image. By repeating the above process for rendering the glasses frame for various images of the recorded set of images, at least a portion of the set of images with their respective overlaid glasses frame renderings may be played back at a display for a user. In some embodiments, the playback of the images with overlaid glasses frame renderings may be controlled by user interaction (e.g., with an interface of the device on which the set of images is played back).

Figure 10:
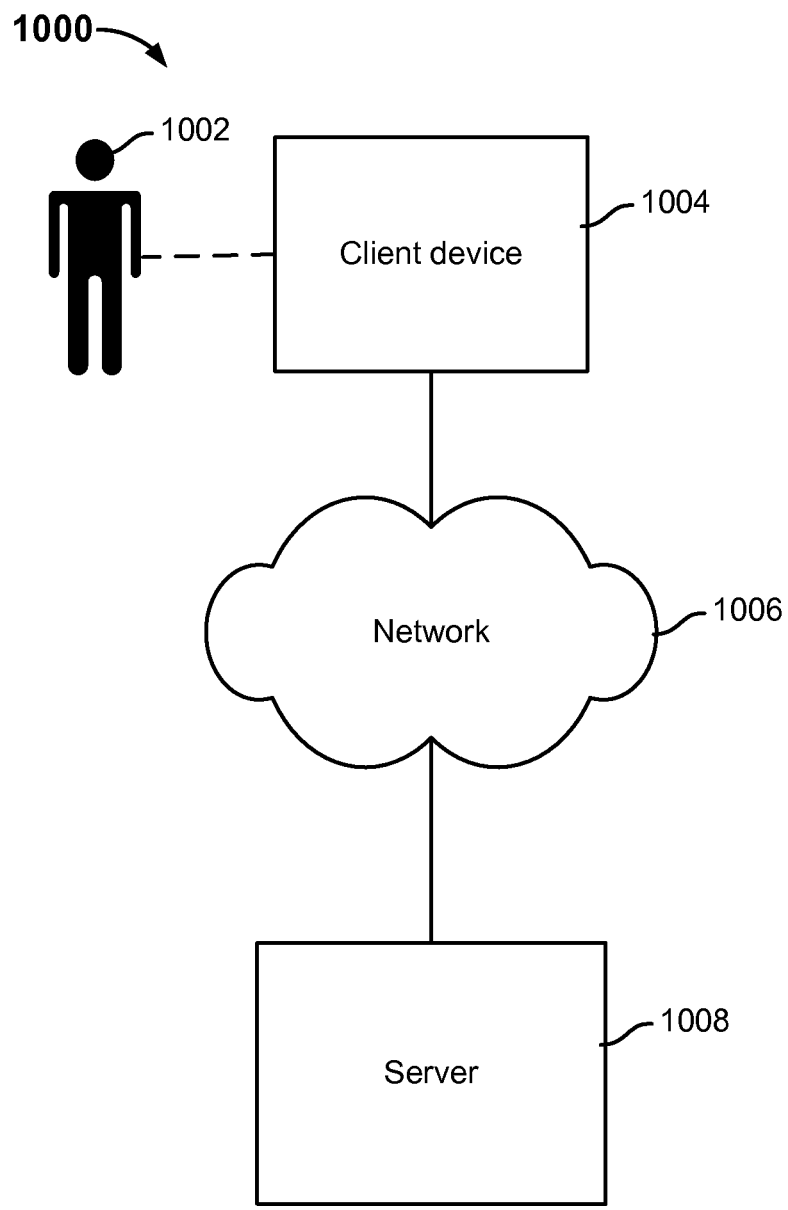
FIG. 10 is a diagram showing an embodiment of a system for displaying glasses with recorded images.

FIG. 10 is a diagram showing an embodiment of a system for displaying glasses with recorded images. In the example, system 1000 includes client device 1004, network 1006, and server 1008. Network 1004 includes high speed data networks and/or telecommunications networks. In some embodiments, client device 1004 is configured to communicate to server 1008 over network 1006.

Client device 1004 is configured to record or receive a set of recorded images corresponding to a user's head at various orientations. Examples of client device 1004 may include a laptop computer, a desktop computer, a tablet device, a mobile device, a smart phone and/or any computing device. For example, the set of recorded images may comprise a video or a series of snapshots. In some embodiments, client device 1004 includes or is connected to a camera device. The camera device and/or a processor of client device 1004 that is running an application can capture a set of images of the user's head as user 1002 turns his or her head in different directions (e.g., as instructed through a user interface of the application). In various embodiments, the set of images is sent to server 1008 for server 1008 to process. In some embodiments, client device 1002 includes a user interface through which the user may interact and view a playback associated with the images.

In various embodiments, server 1008 is configured to receive a set of images sent from a client device such as client device 1004. Server 1008 searches for an optimal representation (e.g., a mathematical 3D model) of the user's (e.g., user 1002) face associated with a set of images and also optimal sets of extrinsic information corresponding to respective images of the set (e.g., a set of extrinsic information is specifically determined for each image of the set).

In various embodiments, server 1008 is configured to receive a selection associated with a glasses frame made by a user (e.g., user 1002) at an interface associated with client device 1004. In some embodiments, the selected glasses frame is selected from a list of glasses frames that are presented with respective fit scores that are determined by server 1008. In various embodiments, server 1008 is configured to render the selected glasses frame for at least a subset of a recorded set of images associated with different orientations of a user's face. Server 1008 is configured to determine the appropriate orientation of the glasses frame to match the orientation of the user's face in an image based on a set of extrinsic information determined for that image. Server 1008 is configured to render the glasses frame with appropriate occluded portions, if any, for the image based on the set of extrinsic information and a model associated with the user's face used for occlusion. In some embodiments, server 1008 is configured to create a two-dimensional (2D) rendering of the glasses frame for the image and to overlay the rendering of the glasses frame over the image. In some embodiments, server 1008 is configured to send the at least a subset of the set of images and the corresponding rendered glasses frames to client device 1004. The client device 1004 is configured to present the at least a subset of the set of images and corresponding rendered glasses frames at a user interface such that a user, such as user 1002, can see a playback of the video that he or she had created with the selected glasses frame overlaid in each of at least a subset of the set of images to experience a virtual try on of the selected glasses frame via the created video/series of snapshots. In some embodiments, the renderings of the glasses frame are presented to be overlaid the recorded set of images instead of a model of the user's face that is derived from the set of images. In some embodiments, client device 1004 is configured to receive user input (e.g., a finger movement tracked on a touch screen or a mouse movement) and to update the playback of the video with the overlaid renderings of the glasses frame in response to the received user input. For example, a user may be able to control the playback of the video such that the user can indicate which orientation of his or her face with the rendered glasses frame he or she wishes to view and when.

In some embodiments, processing of a recorded set of images and/or rendering of a selected glasses frame for one or more images in the set of images described above may also be performed, at least in part, locally at client device 1004. For example, server 1008 can send computer code to client device 1004 that client device 1004 can use to perform at least a portion of the processing and/or rendering locally.

Figure 11:
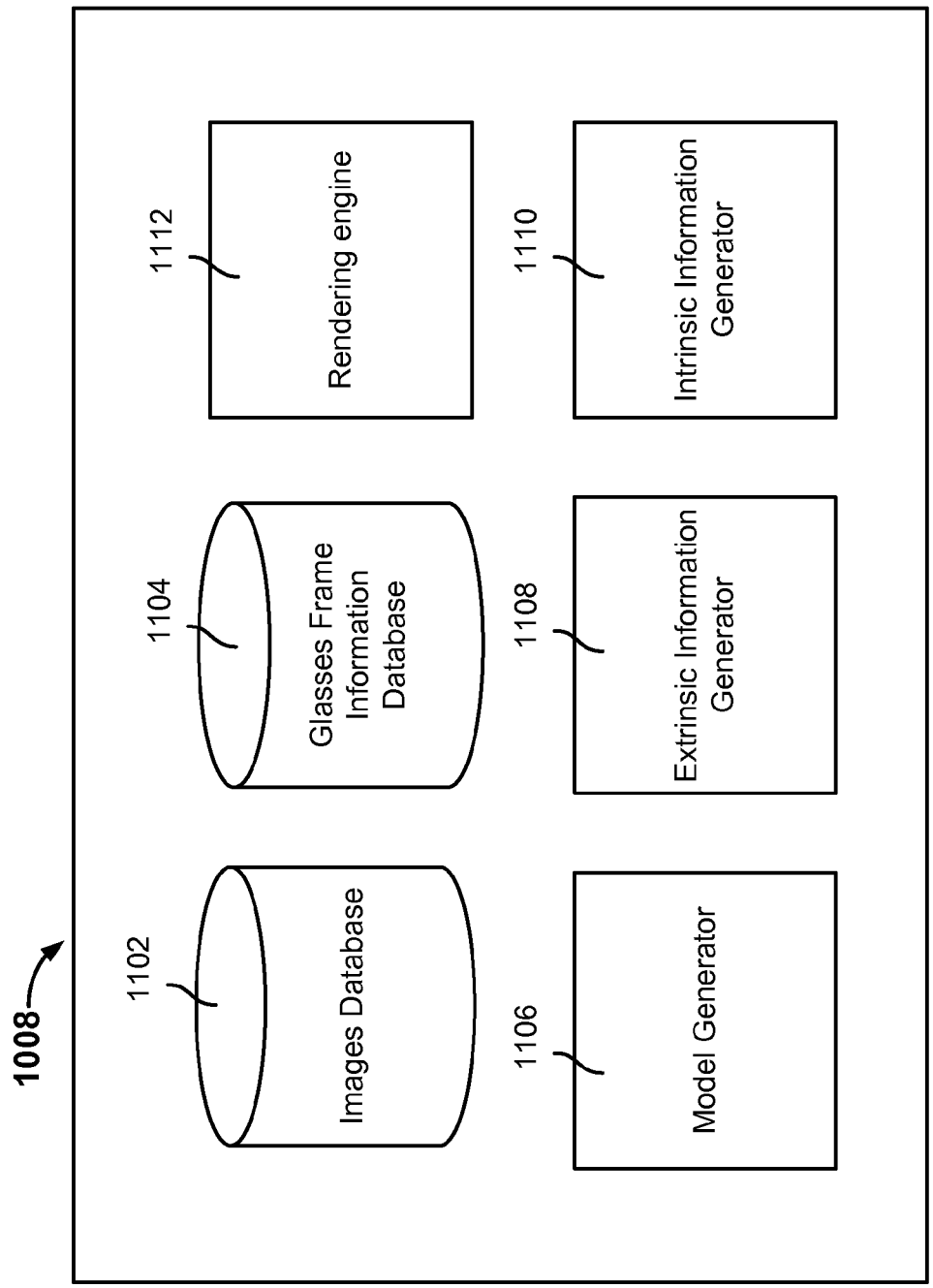
FIG. 11 is a diagram showing an embodiment of a server.

FIG. 11 is a diagram showing an embodiment of a server. In some embodiments, server 1008 of system 1000 of FIG. 10 is implemented using the example of FIG. 11. In the example, the server includes images database 1102, glasses frame information database 1104, model generator 1106, extrinsic information generator 1108, intrinsic information generator 1110, and rendering engine 1112. The server may be implemented with additional, different, and/or fewer components than those shown in the example. Each of images database 1102 and glasses frame information database 1104 may be implemented using one or more databases. Each of model generator 1106, extrinsic information generator 1108, intrinsic information generator 1110, and rendering engine 1112 may be implemented using hardware and/or software.

Images database 1102 is configured to store sets of images. In some embodiments, each set of images is associated with a video or series of snapshots of various orientations of a user's face. In some embodiments, each set of images is stored with data associated with the whole set or individual images of the set.

Model generator 1106 is configured to determine a mathematical 3D model for a user's face associated with each set of images. For example, the mathematical 3D model of the user's face (i.e., the mathematical model of the user's face in 3D space) may be set at the origin. In some embodiments, the mathematical 3D model determined for a user's face is referred to as a M matrix. In some embodiments, the M matrix may be determined based on a set of reference points associated with features on the user's face from the associated set of images. Examples of reference points include endpoints of the user's eye, bridge of the user's nose, and tip of the user's nose. In some embodiments, model generator 1106 is configured to store the M matrix determined for a set of images with the set at images database 1102.

Extrinsic information generator 1108 is configured to determine a set of extrinsic information for each of at least a subset of a set of images. For example, the set of images may be stored at images database 1102. In various embodiments, a set of extrinsic information corresponding to an image of a set of images describes one of more of the orientation and translation of the 3D model determined for the set of images needed to result in correct appearance of the user's face in that particular image. In some embodiments, the set of extrinsic information determined for an image of a set of images associated with a user's face is referred to an $(R, t)$ pair where R is a rotation matrix and t is a translation vector corresponding to that image. As such, the $(R, t)$ pair corresponding to an image of a set of images can transform the M matrix corresponding to that set of images $(R \times M + t)$ into the appropriate orientation and translation of the user's face that is shown in the image associated with that $(R, t)$ pair. In some embodiments, extrinsic information generator 1108 is configured to store the $(R, t)$ pair determined for each of at least a subset of a set of images with the set at images database 1102.

Intrinsic information generator 1110 is configured to generate a set of intrinsic information for a camera associated with recording a set of images. For example, the camera was used to record a set of images stored at images database 1102. In various embodiments, a set of intrinsic information corresponding to a camera describes a set of parameters associated with the camera. For example, a parameter associated with a camera comprises a focal length. In some embodiments, the set of intrinsic information associated with a camera are found by correlating points on a scaling reference object between different images of the user with the scaling reference object in the images, and calculating the set of intrinsic information that represents the camera's intrinsic parameters using a camera calibration technique. In some embodiments, the set of intrinsic information associated with a camera is found by using a technique of auto-calibration which does not require a scaling reference. In some embodiments, the set of intrinsic information associated with a camera is referred to as an I matrix. In some embodiments, the I matrix projects a version of a 3D model of a user's face transformed by an $(R, t)$ pair corresponding to a particular image onto the 2D surface of the focal plane of the camera. In other words, $I \times (R \times M + t)$ results in the projection of the 3D model, the M matrix, in the orientation and translation transformed by the $(R, t)$ pair corresponding to an image, onto a 2D surface. The projection onto the 2D surface is the view of the user's face as seen from the camera. In some embodiments, intrinsic information generator 1110 is configured to store an I matrix determined for the camera associated with a set of images with the set at images database 1102.

Glasses frame information database 1104 is configured to store information associated with various glasses frames. For example, information associated with a glasses frame may include measurements of various areas of the frame (e.g., bridge length, lens diameter, temple distance), renderings of the glasses frame corresponding to various $(R, t)$ pairs, a mathematical representation of a 3D model of the glasses frame that can be used to render glasses image for various $(R, t)$ parameters, a price, an identifier, a model number, a description, a category, a type, a glasses frame material, a brand, and a part number.

Rendering engine 1112 is configured to render a glasses frame to be overlaid on an image. For example, the selected glasses frame may be a glasses frame for which information is stored at glasses frame information database 1104. For example, the image over which the glasses frame is to be overlaid may be stored as part of a set of images stored at images database 1102. In some embodiments, rendering engine 1112 is configured to render a glasses frame (e.g., selected by a user) for each of at least a subset of a set of images. In some embodiments, rendering engine 1112 is configured to transform the glasses frame by the $(R, t)$ pair corresponding to an image. In some embodiments, rendering engine 1112 is also configured to perform occlusion on the transformed glasses frame using an occlusion body comprising a 3D model of a user's face. The occluded glasses frame at the orientation and translation associated with the (R, t) pair excludes certain portions hidden from view by the occlusion body at that orientation/translation. For example, the occlusion body may comprise a generic face 3D model or the M matrix associated with the set of images associated with the image. The rendered glasses frame for an image should show the glasses frame at the orientation and translation corresponding to the image and can be overlaid that image in a playback of the set of images to the user at a client device.

Figure 12:
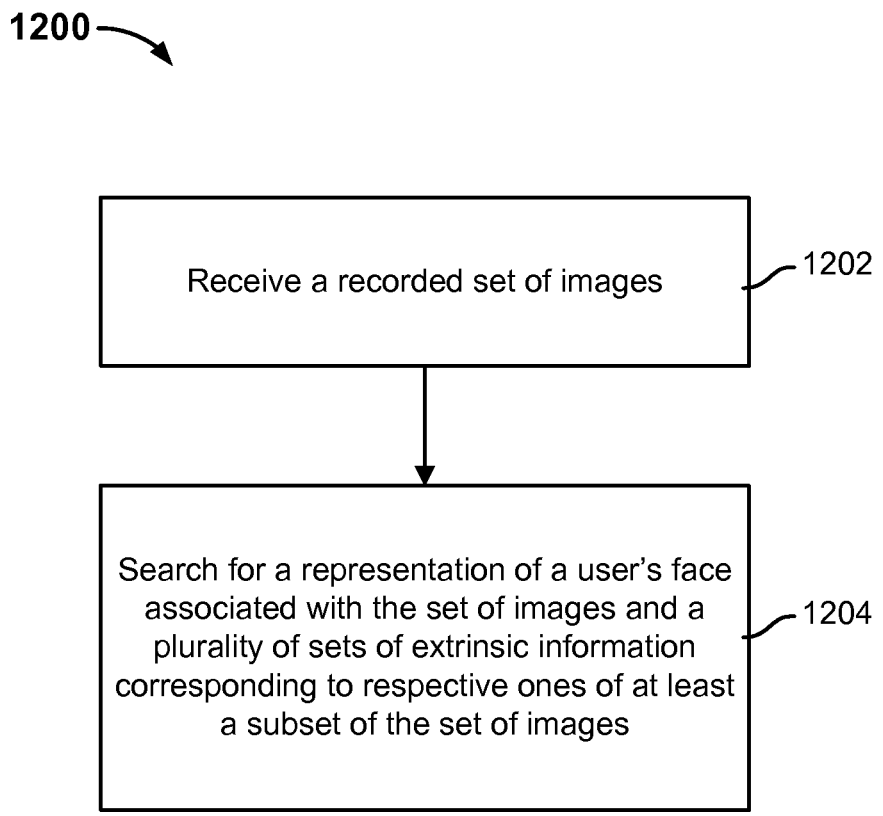
FIG. 12 is a flow diagram showing an embodiment of a process for processing a set of images.

FIG. 12 is a flow diagram showing an embodiment of a process for processing a set of images. In some embodiments, process 1200 is implemented at system 1000 of FIG. 10.

At 1202, a recorded set of images is received. In various embodiments, the set of images corresponds to a recorded video or a series of snapshots of a user's face turned in different orientations. As such, each image of the set is associated with an orientation of the user's face in that image.

At 1204, a representation of a user's face associated with the set of images and a plurality of sets of extrinsic information corresponding to respective ones of at least a subset of the set of images are searched for. In some embodiments, the representation of the user's face is a model in 3D space and is referred to as a M matrix. In some embodiments, the M matrix is determined based at least in part on measured reference points of one or more features associated with the user's face. In some embodiments, the extrinsic set of information associated with an image of the set of images is referred to as an (R, t) pair. An (R, t) pair is determined for each of at least a subset of the set of images so each image corresponds to a respective (R, t) pair that is associated with the orientation of the user's face in that image.

In some embodiments, an optimal M matrix is determined for the set of images and an optimal (R, t) pair is determined for each of at least a subset of the set of images. In a first example, a parameter search is used to perform iterative computations until the optimal M and set of (R, t) pairs are found. For example, a distribution of M matrices (e.g., that have been predetermined based on known face samples or generated on the fly) corresponding to the set of images and a distribution of (R, t) pairs corresponding to each image of the set of images are determined, and a combination of matrix M and (R, t) pairs that best describes at least a subset of the set of images is selected. In another example, a bundle adjust technique is used and the bundle adjust technique may treat the M and the set of (R, t) pairs as unknowns in an optimization problem and iteratively test out various combinations of M matrices and (R, t) pairs until a M and a set of (R, t) pairs are found that best match the set of images. For example, the optimal M matrix and an optimal (R, t) pair corresponding to an image result in the minimum reprojection error of any other combination of a M matrix and an (R, t) pair and therefore the combination of this M matrix and this (R, t) pair best matches the image corresponding to the (R, t) pair. While one M matrix is determined for the set of images, a set of (R, t) pairs, each corresponding to respective ones of at least a subset of the set of images is determined.

In some embodiments, a set of intrinsic information associated with the camera associated with the set of images is also determined via iterative computations. In some embodiments, the set of intrinsic information associated with the camera is predetermined.

Figure 13:
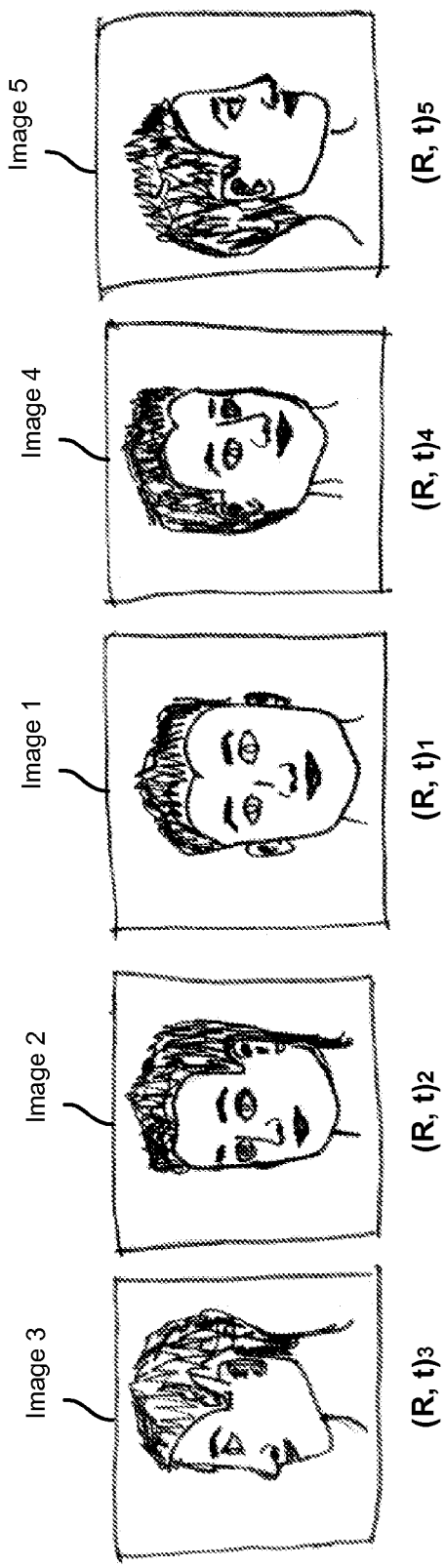
FIG. 13 is a diagram showing several images included in a set of images.

FIG. 13 is a diagram showing several images included in a set of images. In the example, Images 1, 2, 3, 4, and 5 are included in a recorded set of images of a user's face at various different orientations relative to the camera. As described above, a set of extrinsic information (e.g., an (R, t) pair) that describes the orientation and translation of the user's face in an individual image is determined for that image. As shown in the example, each image is identified by a number 1 through 5 and has a corresponding (R, t) pair, which includes the number associated with the image as its subscript (e.g., $(R, t)_1$ pair corresponds to Image 1, $(R, t)_2$ pair corresponds to Image 2). For example, $(R, t)_2$ pair may be used to transform the 3D model of the user's face in the set of images, the M matrix, in 3D space into the orientation and translation of the user's face that is shown in Image 2. Furthermore, to yield the projection of the 3D user's face oriented/translated using $(R, t)_2$ onto the 2D surface of the camera associated with the set of images, $I \times (R_2 \times M + t_2)$ may be computed, where the I matrix corresponds to the set of intrinsic information determined for the camera.

Figure 14:
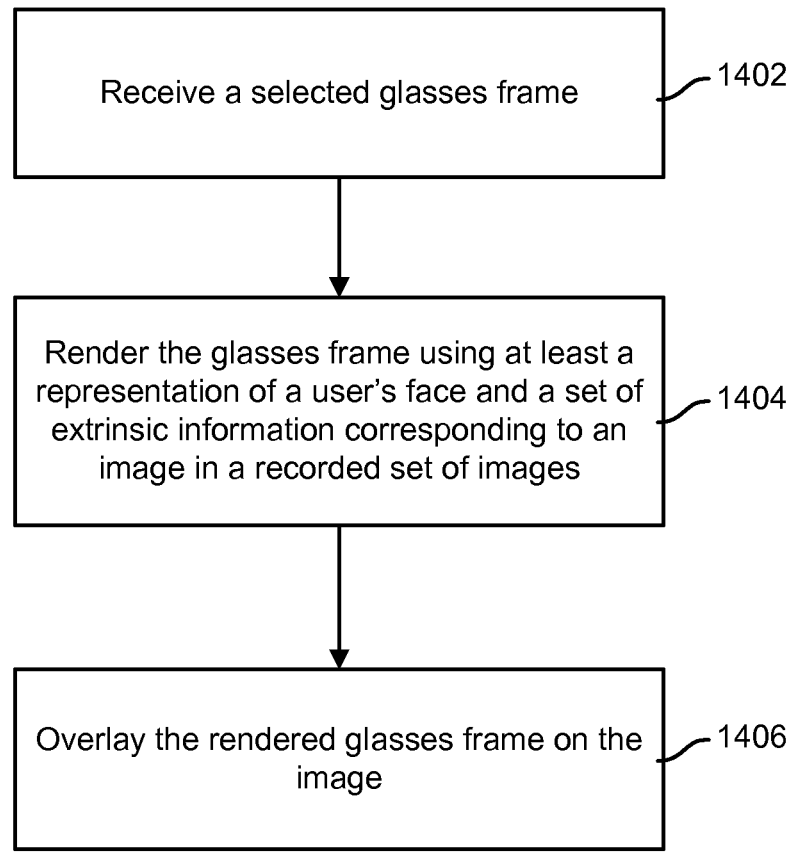
FIG. 14 is a flow diagram showing an embodiment of a process for rendering a glasses frame.

FIG. 14 is a flow diagram showing an embodiment of a process for rendering a glasses frame. In some embodiments, process 1400 is implemented at system 1000 of FIG. 10. Although rendering a glasses frame is described herein, other items can be rendered using a process such as process 1400. Examples of other items include articles that can be worn on the body and/or head such as clothing and jewelry.

At 1402, a selected glasses frame is received. In some embodiments, the glasses frame is selected by a user from among a list of glasses frames presented to the user. For example, the glasses frames on the list are selected by the server to comprise relatively good fits to the facial features of the user. The user may select a glasses frame that he or she would like to virtually try on.

At 1404, the glasses frame is rendered using at least a representation of a user's face and a set of extrinsic information corresponding to an image in a recorded set of images. In some embodiments, a 3D model of the selected glasses frame is obtained. In some embodiments, the 3D model of the selected glasses frame is referred to as a G matrix. In some embodiments, a representation of a user's face comprises a 3D model of a user's face. For example, the representation of the user's face may comprise a M matrix derived for the set of images using a process such as process 1200 of FIG. 12. In another example, the representation of the user's face may comprise a model of a generic face, referred to as the O matrix, that is not specific to the user's face in the set of images. In some embodiments, the set of extrinsic information associated with the image for which the glasses frame is to be rendered can be represented by the (R, t) pair determined for that image. In rendering the glasses frame to match the user's face in the appropriate orientation and translation of the image, the model, the G matrix, associated with the glasses frame is transformed by the (R, t) pair corresponding to the image such that $R \times G + t$, the transformed glasses frame model, reflects the orientation of the glasses frame in which it would appear on the user's face in that image. In some embodiments, the model associated with the glasses frame, the G matrix, is placed onto the representation of a user's face and the combination of the representation of the user's face (either the O matrix or the M matrix, for example) and the model associated with the glasses frame (the G matrix) are transformed by the (R, t) pair corresponding to the image. Then occlusion culling is performed on the transformed glasses frame during the rendering of the glasses frame for that image such that the portions of the glasses frame that are hidden (occluded) by the user's face and/or other head related features (e.g., the user's hair) are not included in the rendering of the glasses frame. Because the representation of the user's face (either the O matrix or the M matrix, for example) is used here to determine occlusions for the glasses, the model is sometimes referred to as an "occlusion body." Furthermore, the transformed and/or occluded glasses frame may be projected onto the 2D surface of the camera associated with the set of images using a matrix I associated with the camera associated with the set of images.

At 1406, the rendered glasses frame is overlaid on the image. In some embodiments, the rendering of the glasses frame for the image comprises a 2D image. In various embodiments, the rendered glasses frame is overlaid on the original image during a playback to the user of at least a subset of the set of images. If 1404 and 1406 were repeated to determine rendered glasses frame for each of at least a subset of the set of images, then the at least subset can be played back to the user with the corresponding rendered glasses frames (e.g., at the corresponding orientations) to create an experience for the user of virtually trying on the selected glasses frame by simply watching the playback. The playback of the originally recorded video or series of snapshots with the rendered glasses will show the user the same video that was recorded with the addition of an overlay of a rendered glasses frame corresponding to each image of the set of images. As a result, in the playback of the video, the renderings of the glasses frame appear to track the user's face in corresponding images. The user may even interact/control the playback using a input (e.g., mouse movement and/or finger movement on a touch screen) to adjust the playback of the video to view different angles of the user's face with the rendered glasses frame as the user would move his or her head around during a physical try on of the selected glasses frame in a store.

Figure 15:
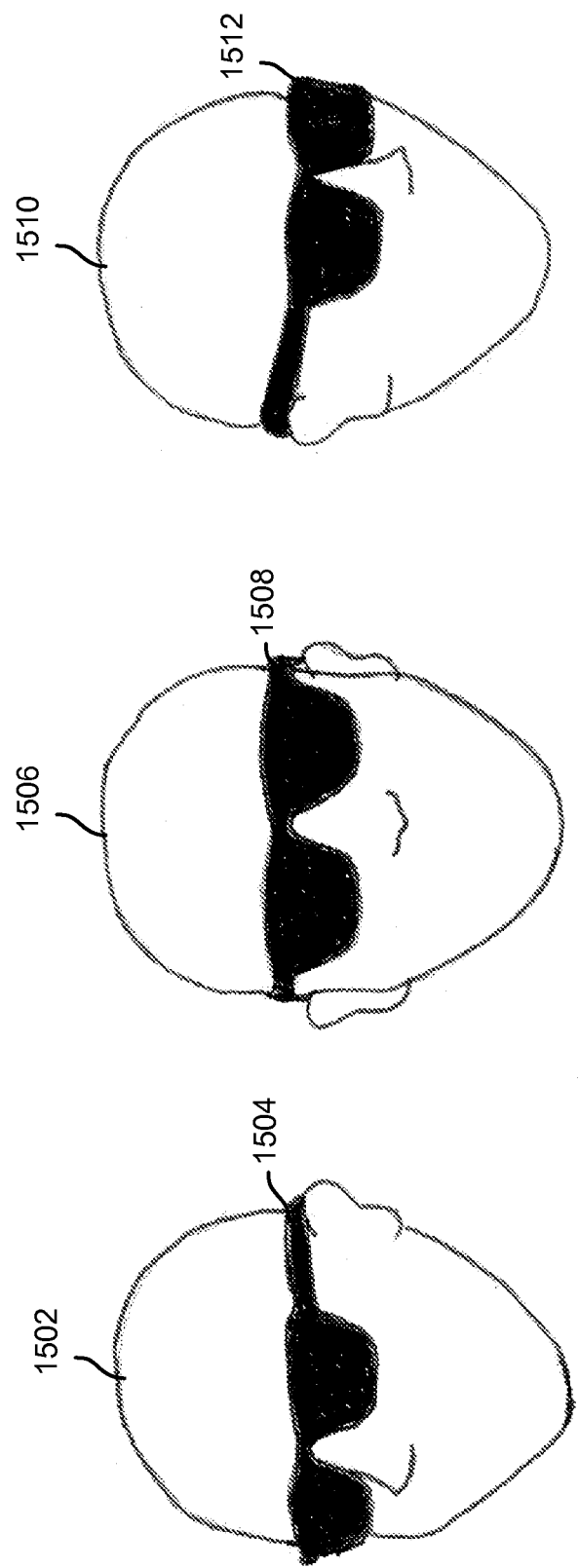
FIG. 15 is a diagram showing three example occlusions of a glasses frame at three different orientations.

FIG. 15 is a diagram showing three example occlusions of a glasses frame at three different orientations. The diagram shows a 3D model of a glasses frame placed on a user's face at three different orientations. For example, the 3D model may comprise a generic face or a model determined for a specific user. As shown in the example, different portions of the glasses frame are visible at different orientations of the user's face. Rendering of the glasses frame 1504 at orientation 1502 shows only one temple of the glasses frame, while the other temple is hidden (occluded) by the 3D model of the user's face. Rendering of the glasses frame 1508 at orientation 1506 shows neither temples of the glasses frame because both temples are mostly obscured (occluded) from view when looking directly at the front of the user's face. Rendering of the glasses frame 1512 at orientation 1510 shows only one temple of the glasses frame (the temple that is hidden in orientation 1502), while the other temple (the temple that is visible in orientation 1502) is hidden (occluded) by the 3D model of the user's face. As such, to create a realistic rendering of the glasses frame on different orientations of the user's face, the glasses frame is rendered with a model of the user's face to achieve the correct occlusions of the glasses frame at each orientation associated with a user's face (e.g., in a particular image). For example, in rendering the glasses frame for a particular orientation, a ray tracing process will take into account areas of the glasses frame that are occluded by the model of a user's face and exclude such portions of the glasses frame from being present in the rendered version.

Figure 17:
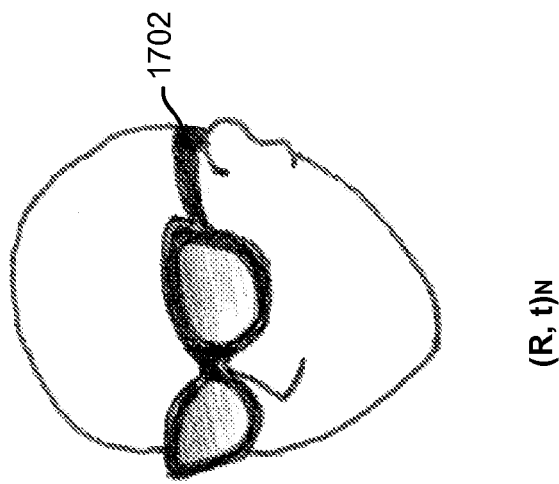
FIGS. 16 through 18 illustrate an example of rendering a glasses frame for an image of a set of images.
Figure 16:
Figure 18:
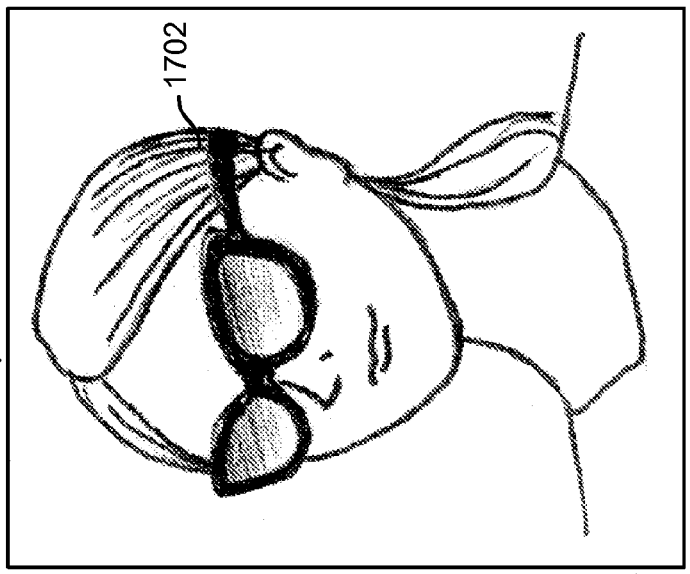

FIGS. 16 through 18 illustrate an example of rendering a glasses frame for an image of a set of images.

FIG. 16 is a diagram showing an embodiment of an image. For example, assume that the image, identified as Image N, is included in a recorded set of images associated with a user's face at various orientations. Image N shows one particular orientation of the user's face. A set of extrinsic information associated with Image N, the $(R, t)_N$ matrix, is computed. FIG. 17 shows a rendering of a glasses frame on a 3D model of a generic face. In the example, glasses frame 1702 is rendered to an orientation and translation corresponding to the user's face in Image N using the $(R, t)_N$ matrix. As shown in the example, the rendered version of glasses frame 1702 does not show a temple that is hidden (occluded) by the model of a user's face at the orientation associated with the $(R, t)_N$ matrix. In the example, the model of a user's face includes two ears but no hair. In another example, the model of the user's face that is used may include modeling of hair associated with the user in the set of images such that occlusions made by the modeled hair with respect to the glasses frame can also be determined in the rendering. FIG. 18 is a diagram showing an embodiment of the image overlaid with the rendered glasses frame. As shown in the example, Image N is now overlaid with the version of glasses frame 1702 that was rendered using the $(R, t)_N$ matrix in FIG. 17. In some embodiments, the light sources in each image and/or environment of the recorded set of images are taken into account to produce photo realistic glasses renderings to be displayed with the images. The process of rendering may be performed on each of at least a subset of other images in the recorded set of images to which Image N belongs so that renderings of glasses frame 1702 can be determined for several different orientations of the user's face.

Figure 19A:
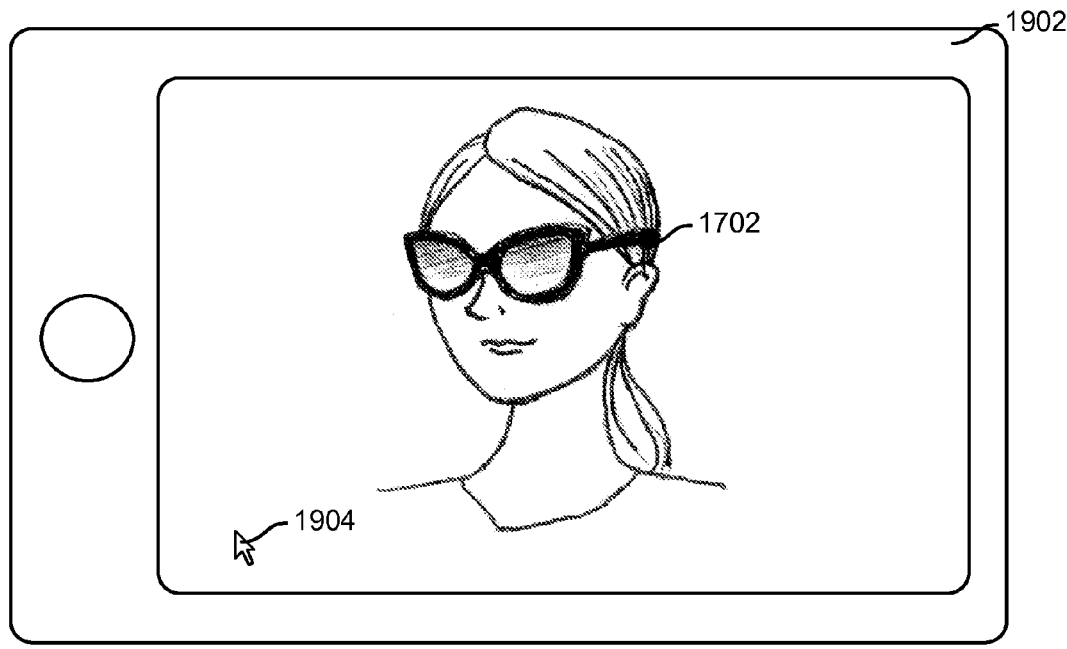
FIGS. 19A and 19B show examples of an interactive playback of a recorded set of images overlaid with renderings of a glasses frame.
Figure 19B:
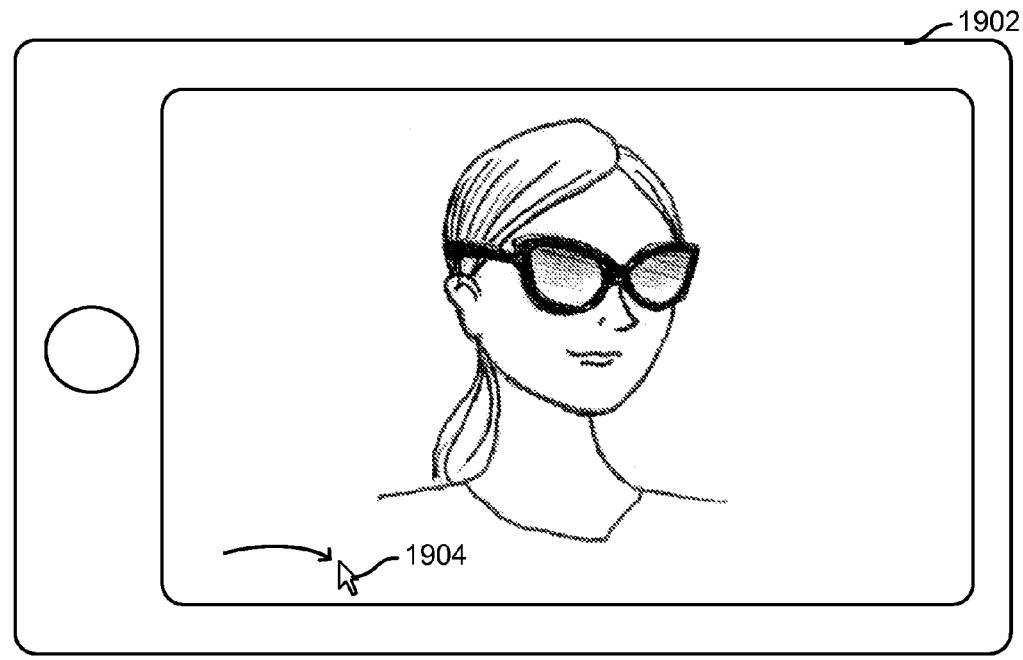

FIGS. 19A and 19B show examples of an interactive playback of a recorded set of images overlaid with renderings of a glasses frame. Continuing the examples of FIGS. 16, 17, and 18, the set of images to which Image N belonged may be played back at a display associated with client device 1902. The playback may include corresponding ones of the set of images overlaid with respective renderings of glasses frame 1702. A user may interact with the playback to control for example, the speed at which the playback is performed and which images/orientations the user wishes to view. In a first example, if client device 1902 is a laptop screen, then the user can control cursor 1904 (e.g., with a mouse device) to adjust the playback of the set of images with overlaid renderings. In a second example, if client device 1904 is a tablet device with a touch screen, then cursor 1904 may comprise the user's finger touching the screen to adjust the playback of the set of images with overlaid renderings. FIG. 19A shows an image of a user looking to the left. Dragging cursor 1904 to the right in FIG. 19B results in the image showing the user looking to the right. While cursor 1904 was being dragged from the position it was in in FIG. 19A to the position it is in in FIG. 19B, several images of the user's face overlaid with the rendered glasses seemingly turning from left to right may appear on the display of client device 1902. This is merely one example of a user interaction with the playback of the set of images and other types of user interaction may be used as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing a set of images, comprising:
a processor configured to:
   receive a set of images, wherein the set of images corresponds to a user's face at one or more orientations; and
   search for a representation of the user's face associated with the set of images and a plurality of sets of extrinsic information corresponding to respective ones of at least a subset of the set of images, wherein to search for the representation of the user's face and the plurality of sets of extrinsic information comprises the processor being configured to:
      determine a plurality of candidate representations of the user's face associated with the set of images;

determine a plurality of candidate sets of extrinsic information associated with an image of the set of images, wherein each of at least a subset of the plurality of candidate sets of extrinsic information describes the user's face at an orientation associated with the image;

select a representation of the user's face from the plurality of candidate representations of the user's face to correspond to the set of images;

select a set of extrinsic information from the plurality of candidate sets of extrinsic information to correspond to the image; and create an image of a rendered item corresponding to the image, wherein creating the image of the rendered item is based at least in part on a representation of an item, the representation of the user's face, and the set of extrinsic information that corresponds to the image; and a memory coupled to the processor and configured to provide the processor with instructions.

2. The system of claim 1, wherein the plurality of candidate representations of the user's face comprises a distribution of representations of the user's face and wherein to select the representation of the user's face includes to select an optimal representation among the distribution of representations of the user's face.

3. The system of claim 1, wherein the plurality of candidate sets of extrinsic information associated with the image comprises a distribution of sets of extrinsic information associated with the image and wherein to select the set of extrinsic information includes to select an optimal set of extrinsic information among the distribution of sets of extrinsic information associated with the image.

4. The system of claim 1, wherein the processor is further configured to search for a set of intrinsic information associated with a camera associated with the set of images.

5. The system of claim 1, wherein the processor is further configured to receive a predetermined set of intrinsic information associated with a camera associated with the set of images.

6. The system of claim 1, wherein to search for the representation of the user's face associated with the set of images and the plurality of sets of extrinsic information comprises iterative computations.

7. A method for processing a set of images, comprising:
receiving a set of images, wherein the set of images corresponds to a user's face at one or more orientations; and
searching for a representation of the user's face associated with the set of images and a plurality of sets of extrinsic information corresponding to respective ones of at least a subset of the set of images, wherein searching for the representation of the user's face and the plurality of sets of extrinsic information comprises:
determining a plurality of candidate representations of the user's face associated with the set of images;
determining a plurality of candidate sets of extrinsic information associated with an image of the set of images, wherein each of at least a subset of the plurality of candidate sets of extrinsic information describes the user's face at an orientation associated with the image;
selecting a representation of the user's face from the plurality of candidate representations of the user's face to correspond to the set of images;
selecting a set of extrinsic information from the plurality of candidate sets of extrinsic information to correspond to the image; and creating, using a processor, an image of a rendered item corresponding to the image, wherein creating the image of the rendered item is based at least in part on a representation of an item, the representation of the user's face, and the set of extrinsic information that corresponds to the image.

8. The method of claim 7, wherein the plurality of candidate representations of the user's face comprises a distribution of representations of the user's face and wherein selecting the representation of the user's face includes selecting an optimal representation among the distribution of representations of the user's face.

9. The method of claim 7, wherein the plurality of candidate sets of extrinsic information associated with the image comprises a distribution of sets of extrinsic information associated with the image and wherein selecting the set of extrinsic information includes selecting an optimal set of extrinsic information among the distribution of sets of extrinsic information associated with the image.

10. A system for rendering a glasses frame, comprising:
a processor configured to:
receive a selection associated with the glasses frame;
create an image of a rendered glasses frame corresponding to a recorded image in a set of recorded images based at least in part on a representation of the glasses frame, a representation of a first face, and a set of extrinsic information corresponding to the recorded image, wherein the set of recorded images corresponds to a second face at one or more orientations, wherein the set of extrinsic information corresponding to the recorded image describes the second face at an orientation associated with the recorded image, wherein to create the image of the rendered glasses frame includes to transform the representation of the glasses frame to correspond to the second face at the orientation associated with the recorded image; and
present the image, including by overlaying the image of the rendered glasses frame on the recorded image; and
a memory coupled to the processor and configured to provide the processor with instructions.

11. The system of claim 10, wherein the first face comprises a generic face.

12. The system of claim 10, wherein the first face comprises the second face.

13. The system of claim 10, wherein to create the image of the rendered glasses frame includes to transform the representation of the glasses frame using the set of extrinsic information corresponding to the recorded image.

14. The system of claim 10, wherein to create the image of the rendered glasses frame includes to create one or more areas of occlusion associated with the glasses frame using the set of extrinsic information corresponding to the recorded image.

15. The system of claim 10, wherein the recorded image comprises a first recorded image, wherein the image of the rendered glasses frame comprises a first image of a rendered glasses frame, and wherein the processor is further configured to:
create a second image of a rendered glasses frame using at least the representation of the glasses frame, the representation of the first face, and a set of extrinsic information corresponding to a second recorded image in the set of recorded images; and
present the second recorded image, including by overlaying the second image of the rendered glasses frame on the second recorded image.

16. The system of claim 10, wherein the set of extrinsic information includes a set of rotation information and a set of translation information associated with the second face at the orientation associated with the recorded image.

17. The system of claim 10, wherein the processor is further configured to present the set of images including the recorded image on which the image of the rendered glasses frame is overlaid.

18. The system of claim 17, wherein the processor is further configured to:
receive a user input; and
update the presentation of the set of images based at least in part on the received user input.

19. A method for rendering a glasses frame, comprising:
receiving a selection associated with the glasses frame;
creating, using a processor, an image of a rendered glasses frame corresponding to a recorded image in a set of recorded images based at least in part on a representation of the glasses frame, a representation of a first face, and a set of extrinsic information corresponding to the recorded image, wherein the set of recorded images corresponds to a second face at one or more orientations, wherein the set of extrinsic information corresponding to the recorded image describes the second face at an orientation associated with the recorded image, wherein to create the image of the rendered glasses frame includes to transform the representation of the glasses frame to correspond to the second face at the orientation associated with the recorded image; and
present the image, including by overlaying the image of the rendered glasses frame on the recorded image.

20. The method of claim 19, wherein the representation of the first face comprises a generic face.

21. The method of claim 19, wherein of the first face comprises the second face.

22. The method of claim 19, wherein creating the image of the rendered glasses frame includes transforming the representation of the glasses frame using the set of extrinsic information corresponding to the recorded image.

23. The method of claim 19, wherein creating the image of the rendered glasses frame includes determining one or more areas of occlusion associated with the glasses frame using the set of extrinsic information corresponding to the recorded image.

24. The method of claim 19, wherein the recorded image comprises a first recorded image, wherein the image of the rendered glasses frame comprises a first image of a rendered glasses frame, and further comprising:
creating a second image of a rendered glasses frame using at least the representation of the glasses frame, the representation of the first face, and a set of extrinsic information corresponding to a second recorded image in the set of recorded images; and
presenting the second recorded image, including by overlaying the second image of the rendered glasses frame on the second recorded image.

25. The method of claim 19, wherein the set of extrinsic information includes a set of rotation information and a set of translation information associated with the second face at the orientation associated with the recorded image.

26. The method of claim 19, further comprising presenting the set of images including the recorded image on which the image of the rendered glasses frame is overlaid.

27. The method of claim 26, further comprising:
receiving a user input; and
updating the presentation of the set of images based at least in part on the received user input.

28. The system of claim 10, wherein the first face comprises a user's face.

* * * * *

UNITED STATES PATENT AND TRADEMARK OFFICE
CERTIFICATE OF CORRECTION

| | | |
|---|---|---|
| PATENT NO. | : 8,708,494 B1 | |
| APPLICATION NO. | : 13/830483 | |
| DATED | : April 29, 2014 | |
| INVENTOR(S) | : Surkov et al. | |

It is certified that error appears in the above-identified patent and that said Letters Patent is hereby corrected as shown below:

In the Claims

In column 19, line 30, claim 19, delete "present" and insert -- presenting --

Signed and Sealed this
Seventeenth Day of March, 2015

Michelle K. Lee
*Director of the United States Patent and Trademark Office*